United States Patent [19]

Castelain

[11] Patent Number: 4,592,503
[45] Date of Patent: Jun. 3, 1986

[54] CONTINUOUS METHOD FOR MANUFACTURING THERMIC LANCES

[76] Inventor: Jean-Pierre Castelain, Rue Ribera 58, B-7200 Colfontaine, Belgium

[21] Appl. No.: 542,744

[22] Filed: Oct. 17, 1983

[51] Int. Cl.⁴ .............................................. B23K 11/06
[52] U.S. Cl. ...................................... 228/147; 228/41
[58] Field of Search ............... 228/110, 129, 130, 131, 228/143, 147, 148, 168, 169; 219/82, 83, 150

[56] References Cited

U.S. PATENT DOCUMENTS

| | | | |
|---|---|---|---|
| 1,794,902 | 3/1931 | Johnson | 228/148 |
| 2,854,561 | 9/1958 | Gold | 219/83 |
| 2,975,087 | 3/1961 | Donald | 228/148 |
| 3,331,120 | 7/1967 | Frost | 228/148 |
| 3,333,754 | 8/1967 | Catalano et al. | 228/147 |
| 3,360,850 | 1/1968 | Avila | 228/110 |
| 3,474,522 | 10/1969 | Rowell | 228/147 |
| 4,053,329 | 10/1977 | Castellucci et al. | 148/6.14 |
| 4,334,138 | 6/1982 | Matsuno et al. | 219/93 |
| 4,421,569 | 12/1983 | Dichter et al. | 148/6.14 |

FOREIGN PATENT DOCUMENTS

| | | | |
|---|---|---|---|
| 803995 | 4/1951 | Fed. Rep. of Germany | 228/147 |
| 864084 | 1/1953 | Fed. Rep. of Germany | 228/148 |
| 2048312 | 12/1980 | United Kingdom | 148/6.14 |

Primary Examiner—Nicholas P. Godici
Assistant Examiner—M. Jordan
Attorney, Agent, or Firm—Fishman & Dionne

[57] ABSTRACT

Thermic lances are produced in a continuous process comprising the following steps:
  a metallic strip successively passes in different shaping frames to obtain a profile, the section of which being approximately U-shaped;
  the wires forming the filling are introduced in the U-shaped profile before the said profile is closed by bringing together both edges of the U-shaped profile in order to shape a tube;
  the tube is welded by low frequency using a seam welding wheel, the profile being simultaneously submitted to an outer deformation which brings together both edges of the U-shaped profile; and
  finally the obtained filed tube passes through one or more finishing frames.

5 Claims, 2 Drawing Figures

CONTINUOUS METHOD FOR MANUFACTURING THERMIC LANCES

BACKGROUND OF THE INVENTION (1) Field of the Invention

The present invention relates to a continuous method for manufacturing thermic lances.

(2) Description of the Prior Art

Thermic lances are made from a steel tube filled with metal wires. At one end, the tube is connected to an oxygen source through a pressure regulator. The oxygen is admitted at the other end when the said other end has been heated up, locally, to approximately 800°–900° C. by any heat source such as torch or a blow lamp.

A strong oxydation reaction of the steel takes place, thus producing a powerful flame with a temperature of approximately 2500° C. The length of the flame is variable, depending on the diameter of the lance and of the oxygen pressure. The produced heat can be used to cut or drill ferrous or non-ferrous material, including cast iron in open air and also possibly under water.

The flame also produces an iron oxide which acts as a melting agent, thus reducing an iron oxide which acts as a melting agent, thus reducing the melting point of concrete or rock, from about 2000°–2500° C. to approximately 1100°–1500° C. This phenomenon causes a pasty melt and elimination of material, which enables the thermic lances to be used to drill or to cut concrete elements and most rocks.

Generally, the method for manufacturing thermic lances comprises the introduction of wires in a discontinous process, that is to say by manual work, in metallic tubes of a limited length. This method is slow and presents all disadvantages of discontinuous process, such as the impossibility to choose variable lengths for the lances important manual efforts and expensive manufacturing. Furthermore, the tubes can only be filled partially compared to the number of wires which could theoritically be filled in the tube.

OBJECT OF THE INVENTION

An object of the present invention is to supply a continuous method wherein the filling consisting of metallic wires is continuously introduced into the tube during the manufacturing of said tube. In this manner the labour costs and consequently the manufacturing costs of thermic lances are substantially reduced.

Further objects and advantages of the invention will become apparent to those skilled in the art from the following description.

SUMMARY OF THE INVENTION

In first attempts for resolving the problem of rendering possible the continuous process, the applicant has made fifferent manufacturing tests to thermic lances by introducing the filling during manufacturing of the tube, the siad tube being welded by high frequency induction and the wires being used as induction ferrite (impeder). However the use of this technique has shown that, for a very slow rate of the process, the electrical energy comsumption was very high and that, consequently, this method was not economical.

According to the present invention, there is provided a continuous method of manufacturing thermic lances wherein:

a metallic strip successively passes in different shaping frames to obtain a profile, the section of which being approximately U-shaped;

the wires forming the filling are introduced in the U-shaped profile before the said profile is closed by bringing together both edges of the U-shaped profile in order to shape a tube;

the tube is welded by low frequency using a seam welding wheel, the profile being simultaneously submitted to an outer deformation which brings together both edges of the U-shaped profile; and finally the obtained filed tube passes through one or more finishing frames.

According to the invention, one or more wires of the filling material are preferably undulated, crimped or twisted around one or more central wires, before their introduction in the U-shaped profile, so that the wires are submitted to a flattening due to the outer deformation which is applied to close the tube, the applied strength being less than the elastic stress limit of said wires. By this way, the obtained product consists of a tube comprising inner wires which are maintained in the said tube by an elastic strength.

This constitutes an important improvement obtained by the invention, because until now it was usual to deform the outer tube after the manufacturing of the lance in order to clamp the wires of the filling and to prevent the said to be expelled by the oxygen pressure. The process of the present invention aovids the drawback of the outer deformation of the state of the art which resulted in an irregular combustion of the lance.

The method of the invention provides a regular tube without outer stamping, marks or wound, wherein the securing of the wires of the filling in the inner of the tube results from the elastic deformation they have undergone.

Another advantage of the invention is that thermic lances in any length may be produced, because it is possible to cut a desired length during the continuous manufacturing, the thermic lances having a constant quality and being manufactured at a relatively high rate with minimum energy consumption.

Furthermore, it is not necessary to overcome the friction forces during the introduction of the wires constituting the filling and it is possible to obtain a filling of the tube by said wires better than the manual method would allow.

BRIEF DESCRIPTION OF THE DRAWINGS

The present invention may be better understood and its numerous advantages will be apparent to those skilled in the art by reference to the accompanying drawings:

With reference to FIG. 1 and 2, the apparatus for continuously manufacturing filled tubes comprises a system of successive frames 1 to 5 for shaping a metallic strip 6 to form a tube, and equipment 7 for welding the shaped tube by low frequency resistance welding, using a seam welding wheel. This apparatus may also comprise various finishing frames such as at 8 and 9.

Figure 1:
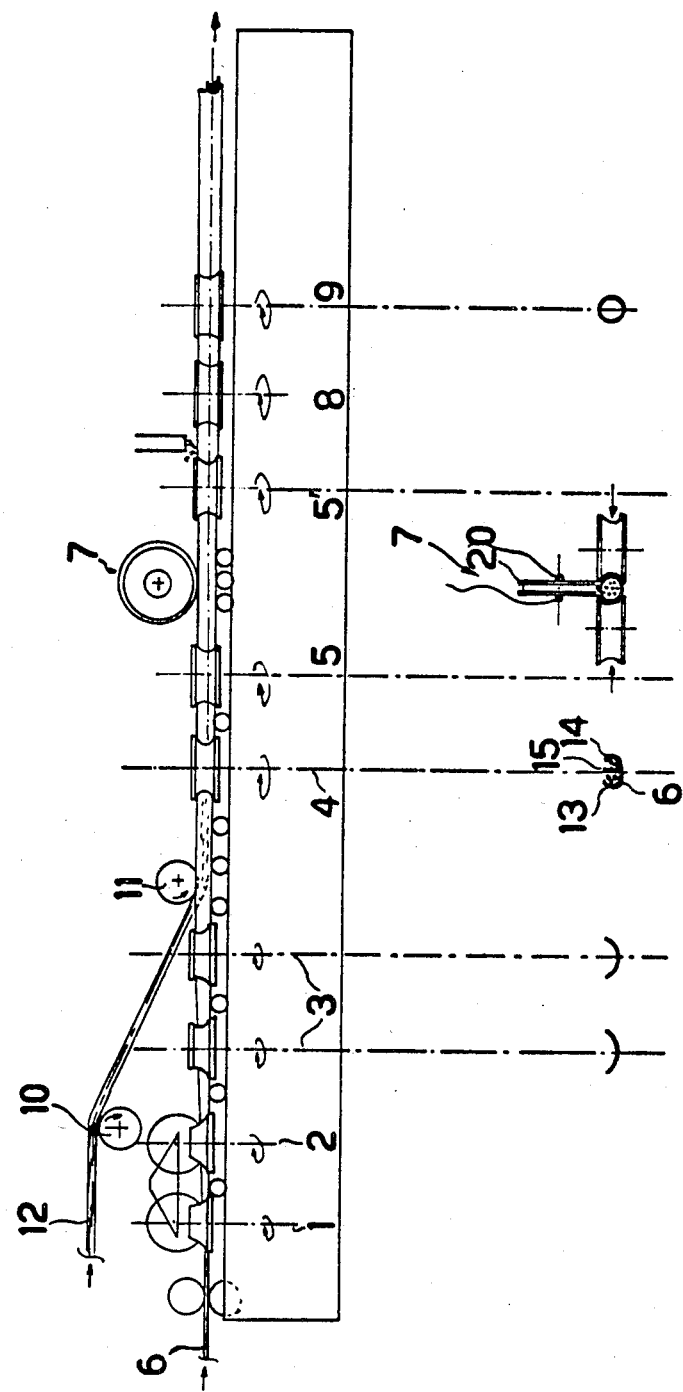
FIG. 1 is a manufacturing plant for continuous manufacturing of the thermic lances according to the present invention.

According to the present invention, this apparatus also comprises means, such as indicated at 10, 11, for feeding a filling 12 to the inside of the tube. These feeding means 10, 11 are preferably designed so as to feed the filling 12 to the inside of the tube 6 between two shaping frames so that the tube being formed is sufficiently open to enable the filling 12 to pass easily into the tube 6. In the example shown, and as can be seen from FIG. 2, it is preferable to feed the filling 12 to the inside of the tube 6 between the shaping frames 3 and 4 because, at this stage in the formation of the tube, the longitudinal edges 13, 14 of the metallic strip 6 are still sufficiently spaced apart so as not to hinder or prevent the passage of the filling whilst being sufficiently raised to retain satisfactorily the elements 15 of the filling 12 inside the tube 6.

Preferably, this apparatus may comprise a device for undulating or crimping at least one element 15 of the filling 12 before its introduction into the tube. This undulating device 16 is thus advantageously disposed upstream of the means 10, 11 for feeding the filling 12 to the inside of the tube.

This device may also be replaced by a device which is able to wind wires like an helice around one or more central wires.

The method of manufacturing continuously filled tubes with this apparatus is particularly simple and is as follows:

A metallic strip 6 is passed into the shaping frames 1 to 5 to shape it into the form of a tube (see FIG. 2), whilst the elements 15 of the filling 12 are introduced during the shaping operation of the tube when the longitudinal edges 13, 14 of the strip 6 are sufficiently spaced apart so as not hinder or prevent the passage of the filling 12 whilst permitting the filling 12 to be retained inside the tube 6. The metallic strip, which is shaped to form a tube in 7, is then welded by low frequency resisting welding using a seam welding wheel and simultaneously supported in its shape by the frames 5 and 5', and then a finishing treatment is effected for the filled tube in the finishing frames, such as 8 and 9, so as to obtain a precise calibration for the tube, and also, for example, to obtain a cut in length, to effect a marking or a stamping of each filled tube or to give a particular shape to the tube so that the filling can not escape from the said tube.

This method therefore enables the tubes to be filled automatically whilst minimizing the labour costs, and this is of particular economical interest.

Moreover, whilst achieving the crimping or the undulation of at least one element 15 of the filling 12 before its introduction into the tube, each undulated element exerts a reaction by a "spring" effect with the other elements which may, preferably, also be undulated or crimped and thus pressed against the internal wall of the accommodating tube, and this permits adequate immobilization during normal usage and usual handling.

Of course, the number of filling elements to be undulated and the amplitude of the undulation are to be adapted in dependence upon the nature and therefore upon the mechanical characteristics of the elements 15 used.

Furthermore, the low frequency resisting welding using a seam welding wheel is the most advantageous method to weld the edges of the U-shaped profile in order to obtain a tube and differs, therefore, from the other welding methods.

Figure 2:
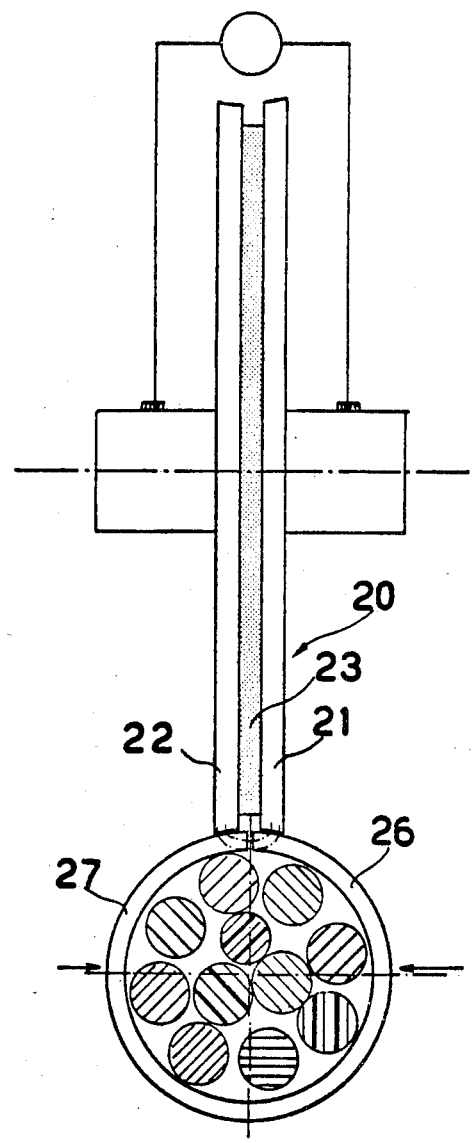
FIG. 2 is, at a larger scale than that of FIG. 1, the welding device which is used.

FIG. 2 is a schematic view of a seam welding wheel which enables the welding of the tube filled with the metallic wires of the filling. The seam welding wheel 20 advantageously consists in two conducting discs 21 and 22 separated by a dielectric material 23. The seam welding wheel is supplied by a high intensity, low frequency current source 25. Each conducting disc 21, 22 lies on one of the edges 26, 27 of the U-shaped profile, said edges being joined to shape the tube. The high intensity current passes through the joint of the two edges 26, 27 applied one against the other, with the current heating the tube at this point so that the edges are welded together.

This technique is particularly advantageous and does not require any additional precaution in order to protect the tube filling.

Additionally, the thermic lances obtained according to the method of the present invention may subsequently be plunged in a passivating bath enabling in some degree the protection against oxidation by atmospheric agents.

The term "low frequency" as used in the specification and claims is to be be understood as lower than about 250 Hertz, a value of approximately 200 Hertz being preferably used in the invention.

I claim:

1. A continuous method of manufacturing thermic lances, said method comprised of the following steps:
   successively passing a metallic strip in different shaping frames to obtain a profile having a section which is approximately U-shaped;
   undulating, crimping or twisting one or more wires forming the filling around one or more central wires;
   introducing the wires forming the filling in the U-shaped profile in order to shape a tube;
   welding the tube by low frequency using a seam welding wheel, the profile being simultaneously submitted to an outer deformation which brings together both edges of the U-shaped profile, the outer deformation which is applied to close the tube flattening the wires of filling, the applied deformation being less than the elastic stress limit of said wires;
   passing the filled tube through one or more finishing frames; and
   subsequently plunging the filled tube in a passivating bath to provide protection against oxidation by atmospheric agents.

2. Apparatus as claimed in claim 3 wherein the seam welding wheel includes conducting discs separated by a dielectric material, the seam welding wheel being supplied by a high intensity, low frequency current source, each conducting disc lying on one of the edges of the U-shaped profile which have to be joined to shape the tube.

3. Apparatus for continuously manufacturing filled tubes comprising:
   means for successively passing a metallic strip in different shaping frames to obtain a profile having a section which is approximately U-shaped;
   means for undulating, crimping or twisting one or more wires forming the filling around one or more central wires;
   means for introducing the wires forming the filling in the U-shaped profile in order to shape a tube;
   means for welding the tube by low frequency using a seam welding wheel, the profile being simultaneously submitted to an outer deformation which brings together both edges of the U-shaped profile to define a filled tube, the outer deformation which is applied to close the tube flattening the wires of filling, the applied deformation being less than the elastic stress limit of said wires;

means for passing the filled tube through one or more finishing frames.

4. A continuous method of manufacturing thermic lances, said method comprised of the following steps:

successively passing a metallic strip in different shaping frames to obtain a profile having a section which is approximately U-shaped;

undulating, crimping or twisting one or more wires forming the filling around one or more central wires;

introducing the wires forming the filling in the U-shaped profile in order to shape a tube;

welding the tube by low frequency using a seam welding wheel, the profile being simultaneously submitted to an outer deformation which brings together both edges of the U-shaped profile to define a filled tube, the outer deformation which is applied to close the tube flattening the wires of filling, the applied deformation being less than the elastic stress limit of said wires; and passing the filled tube through one or more finishing frames.

5. A method as claimed in claim 4 including the step of:

subsequently plunging the filled tube in a passivating bath to provide protection against oxidation by atmospheric agents.

* * * * *